US008522351B2

(12) United States Patent
Lu et al.

(10) Patent No.: US 8,522,351 B2
(45) Date of Patent: Aug. 27, 2013

(54) PRODUCTION SECURITY CONTROL APPARATUS FOR SOFTWARE PRODUCTS AND CONTROL METHOD THEREOF

(75) Inventors: Zhou Lu, Beijing (CN); Huazhang Yu, Beijing (CN)

(73) Assignee: Feitian Technologies Co., Ltd., Beijing (CN)

(*) Notice: Subject to any disclaimer, the term of this patent is extended or adjusted under 35 U.S.C. 154(b) by 899 days.

(21) Appl. No.: 11/535,412

(22) Filed: Sep. 26, 2006

(65) Prior Publication Data

US 2007/0204328 A1   Aug. 30, 2007

(30) Foreign Application Priority Data

Jan. 27, 2006   (CN) .......................... 2006 1 0002399

(51) Int. Cl.
*H04L 29/06*   (2006.01)
(52) U.S. Cl.
USPC ............................................... 726/26; 726/9
(58) Field of Classification Search
USPC ................. 726/2, 9, 31–33, 26; 380/201
See application file for complete search history.

(56) References Cited

U.S. PATENT DOCUMENTS

| | | | |
|---|---|---|---|
| 6,088,802 A * | 7/2000 | Bialick et al. ................... 726/3 |
| 6,836,844 B1 * | 12/2004 | Kori et al. ...................... 713/176 |
| 6,952,479 B2 * | 10/2005 | Shavit et al. ................... 380/201 |
| 7,032,240 B1 * | 4/2006 | Cronce et al. ................... 726/2 |
| 7,530,116 B2 * | 5/2009 | Newman ........................ 726/31 |
| 2004/0025031 A1 * | 2/2004 | Ooi et al. ...................... 713/186 |
| 2005/0050352 A1 * | 3/2005 | Narayanaswami et al. ... 713/201 |
| 2006/0106723 A1 * | 5/2006 | Pippuri .......................... 705/57 |

* cited by examiner

*Primary Examiner* — Ali Abyaneh
(74) *Attorney, Agent, or Firm* — Hammer & Associates, P.C.

(57) ABSTRACT

The present invention relates to a production security control apparatus for software products and the control method thereof. The present invention uses security control devices to control the production process for software products, which ensures that the production process cannot proceed without appropriate security control device. There are many ways to embody the present invention and the security level can be customized. The device is simple and easy to use. In addition, the leak of protected code can be prevented—because the data in the production host is not copied to the dongle directly, unauthorized dongles cannot work with the software itself directly. Moreover, the unauthorized production of dongles can be prevented as well—the production number of dongles is also restricted by the developer, which ensures that illegal bulk production cannot occur without authorization.

6 Claims, 3 Drawing Sheets

PRODUCTION SECURITY CONTROL APPARATUS FOR SOFTWARE PRODUCTS AND CONTROL METHOD THEREOF

FIELD OF THE INVENTION

The present invention relates to a production security control apparatus for software products and the control method thereof.

BACKGROUND OF THE INVENTION

As information technology develops, an increasing number of software products that are customized to a particular application field or industry have been created. The core technology is vital to any software. Once the core technology is stolen or duplicated illegally by others, the loss will be inestimable.

As information security apparatuses, the software copyright protection products are important in software copyright protection field. They can protect software developer's interests, increase profit, protect legal user's interests and control software distribution.

Besides the anti-attack capability of the software itself and the security of the hardware protection apparatus itself, software product copyright protection should also involve the management and control in the production process. If the production process is not controllable, the security threats in production process can not be blocked, even if perfect security measures are adopted after the sales of the products.

We use dongles to control the legitimate usage of software products after they are sold. But it is possible that an unauthorized user gets the production data of dongles during the production process of the software products and then clones a "dongle" illegally. Then the anti-piracy efforts for the software will be made in vain. Therefore, the security control in production process is very important.

SUMMARY OF THE INVENTION

The present invention overcomes the above defects and provides a production security control apparatus for software products and the control method thereof for safely and effectively maintaining information security during the production process of software products.

The solution of the present invention to the technical problems is: a production host with a communication interface and a security control device, which is connected to the production host via the communication interface for transmitting data.

The security control device may comprises a master chip, and a communication module and a storage module which are connected to the master chip respectively, and the master chip is a microprocessor or smart card chip comprising a Central Processing Unit (CPU), a Micro Controller Unit (MCU) or a Single Chip Micyoco (SCM).

The communication module is a USB interface, serial interface or parallel interface communication module.

The communication module and/or the storage module are built into the master chip, or are a communication interface chip and/or an external storage module that are separated from the master chip.

A security control method using the production security control apparatus for software products, in which it is necessary that the in-dongle data for producing a software protection dongle comprises the key code required to be burned into the dongle along with the control code placed in the security production apparatus.

The in-dongle data for producing software products is in the form of cipher text, which is decrypted to plain text by the security control device and then the production host begins to produce the software products.

The in-dongle data is stored in the security control device as cipher text, which is burned into the dongle by the production host, and the dongle then decrypts the burned data and uses the resulting data.

The in-dongle data is stored in the production host as plain text, which is encrypted by the security control device, and then the cipher text is burned into the dongle with a production tool, and then the dongle decrypts the burned data and uses the resulting data.

A function of judging whether the current number of software products produced is greater than the authorized number of products; and if it is, the production of dongles is not allowed to proceed.

The encryption/decryption algorithm is RSA, DES or 3DES.

Compared with the existing technologies, the benefits of the present invention are: there are many ways to embody the present invention; security level can be customized; the device is simple and easy to use; the production process cannot proceed without appropriate security control device. In addition:

(1) The leak of protected code can be prevented—because the data in the production host is not copied to the dongle directly, unauthorized dongles cannot work with the software itself directly;

(2) The unauthorized production of dongles can be prevented as well—the production number of dongles is also restricted by the developer, which ensures that illegal bulk production cannot occur without authorization.

BRIEF DESCRIPTION OF THE DRAWINGS

The present invention may be further understood from the following description in conjunction with the appended drawings. In the drawings.

DETAILED DESCRIPTION OF THE EMBODIMENTS

In the present invention, the software product can be a dongle or other product that has built-in software. To illustrate, use the production host and the security control device for producing dongles for software protection to further describe the present invention.

Figure 1:
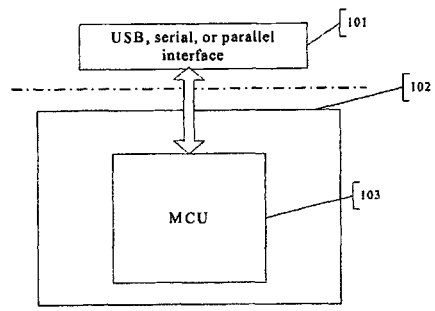
FIG. 1 is a block diagram of the hardware structure according to the first embodiment of the security control device of the present invention.
Figure 2:
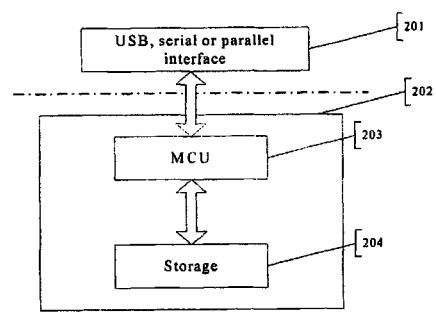
FIG. 2 is a block diagram of the hardware structure according to the second embodiment of the security control device of the present invention.
Figure 3:
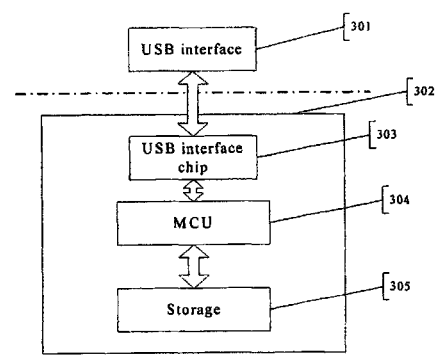
FIG. 3 is a block diagram of the hardware structure according to the third embodiment of the security control device of the present invention.

FIGS. 1, 2 and 3 are block diagrams of the security control device of the present invention.

FIG. 1 is a block diagram of a security control device. The software protection apparatus 102 comprises a master chip 103. The master chip 103 is a MCU integrated with a storage module and an interface module. The software protection apparatus is connected to the production host via a USB interface, serial interface or parallel interface 101 for communicating data.

FIG. 2 is a block diagram of another security control device. The software protection apparatus 202 comprises a master chip MCU 203 that is integrated with an interface module and an external storage 204 that is attached to the MCU. The software protection apparatus is connected to the production host via a USB interface, serial interface or parallel interface 201 for communicating data. The storage can be RAM, ROM, FLASH, EPROM, EEPROM etc.

FIG. 3 is a block diagram of a third security control device. The software protection apparatus 302 comprises a MCU 304 used as master chip, and a communication module 303 and an external storage 305 that are connected to the master chip respectively. The communication module 303 is a USB interface chip. The software protection apparatus is connected to the production host via a USB interface 301 for communicating data. The storage can be RAM, ROM, FLASH, EPROM, EEPROM etc.

Based on any of the above structures, the security control method of the present invention will be described in details with the following embodiments.

$1^{st}$ embodiment: in-dongle data is stored in a host in the form of cipher text. After the host is connected to a security control device, the security control device decrypts the data and burns the plain text data into the dongle with a production tool, then the dongle can use the burned data directly. The detailed steps are:

1) When the host detects the security control device, it establishes communication with the device.

While producing the dongle for software protection (herein "the dongle"), the production tool will not start the production process until it detects the security control device. Otherwise, it will deny the production.

2) The host sends commands or data to the security control device.

After the security control device is detected, the host sends the data to be encrypted/decrypted to the security control device or requests to read the data to be burned from the security control device via a USB, serial, or parallel interface, and waits for the response from the device.

3) After the security control device receives the commands or data, it processes the commands or data.

The security control device encrypts or decrypts the received commands or data, or prepares for the data requested by the host. The security control device must be authorized or valid hardware. The resulting data in this step will be burned into the dongle, and contains the necessary part of the software product.

4) The security control device returns the data to the host.

The security control device returns the data to the application program via a USB, serial, or parallel interface. The data can be restored to what that is necessary for producing the dongle only if the security control device is the designated and valid hardware.

Thereby the production of the dongle can proceed normally. Otherwise, the production of the dongle will cease, or even if the production continues, the finished dongle cannot work with the software correctly.

5) The host burns the processed data into the dongle with a production tool.

Figure 4:
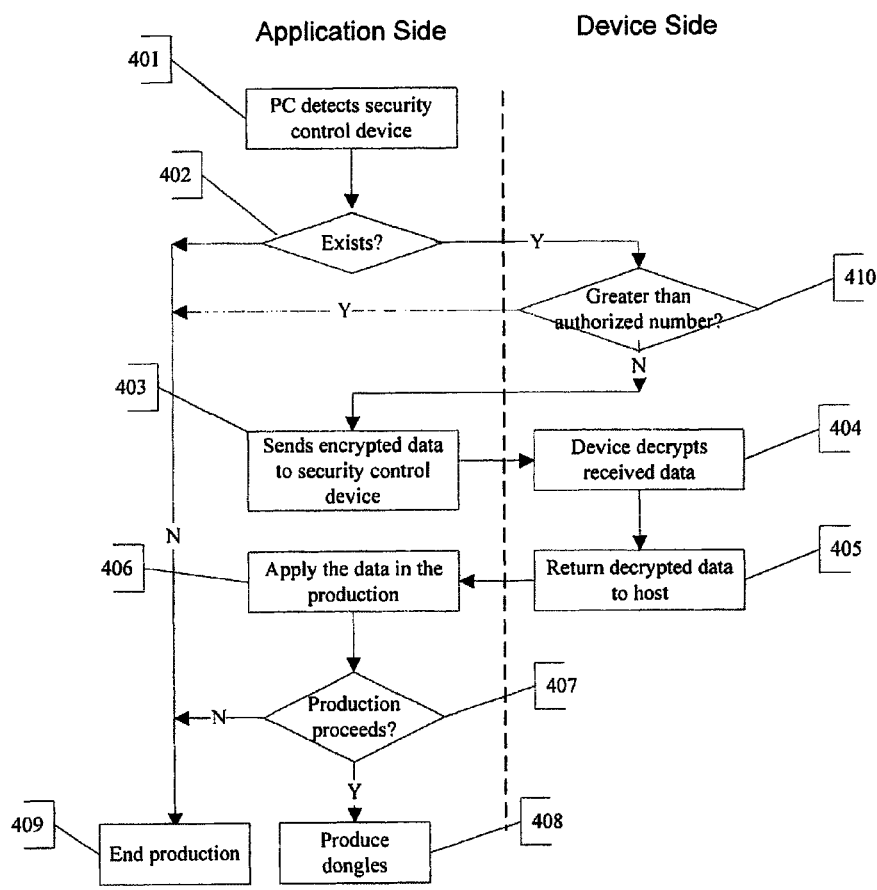
FIG. 4 is a control flow diagram according to the first embodiment of the present invention.

Referring to FIG. 4, the application side of production starts the production process. The production host detects the security control device, as shown in Step 401, and judges whether it exists or not, as shown in Step 402. If not, go to Step 409 to finish the production. If it exists, judge whether the number of the dongles produced is greater than the number of the dongles authorized, as shown in Step 410. If it is, the production process will cease. Otherwise, send the encrypted data to the security control device, as shown in Step 403. The apparatus of the present invention will decrypt the received data, as shown in Step 404, and return the decrypted data to the production host, as shown in Step 405. Once the host receives the data, it will apply the data in the production, as shown in Step 406, and determine whether the data is of integrity and reliability, and whether the production can proceed, as shown in Step 407. If the production can proceed, produce the dongles for software products, or end the production.

$2^{nd}$ embodiment: the in-dongle data is stored in the security control device in the form of cipher text. Then the cipher text is burned into the dongle with a production tool. The dongle decrypts the burned data and uses the resulting data.

Figure 5:
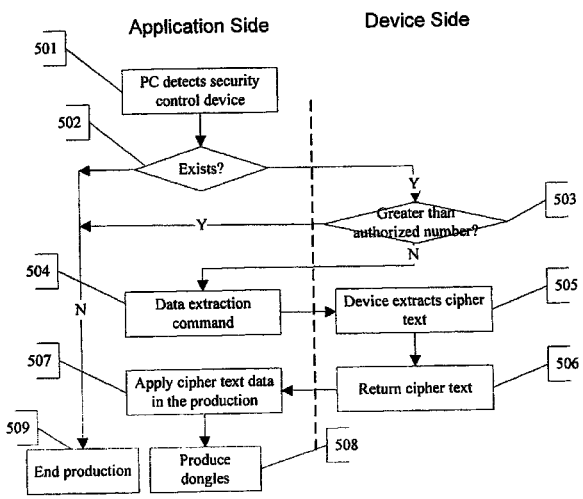
FIG. 5 is a control flow diagram according to the second embodiment of the present invention.

Referring to FIG. 5, the production host starts the production process. The host detects the security control device, as shown in Step 501 and judges whether it exists or not, as shown in Step 502. If not, go to Step 509 and end the production. If it exists, judge whether the number of dongles produced is greater than the number of dongles authorized, as shown in Step 503. If it is, end the production process. Otherwise, send the commands to get data to the security control device, as shown in Step 504. The security control device will extract the data according to the commands, as shown in Step 505. The data stored in the security control device is cipher text data. All cipher text data that has been read will be returned to the host, as shown in Step 506. After that, the host will apply the cipher text data in the production, as shown in Step 507 and continue to produce dongles for software products.

The above process can ensure that the production department cannot begin producing dongles without the security control device. The built-in decryption code can be setup inside the dongle in the case of that the burned data provided to the dongle by the security control device is cipher text. The decrypted data is the data required for the dongle to operate.

$3^{rd}$ embodiment: the in-dongle data is stored in the production host in the form of plain text. The plain text is encrypted by using the security control device. Then the encrypted data will be burned into the dongle with a production tool. The dongle decrypts the burned data and uses the resulting data.

Figure 6:
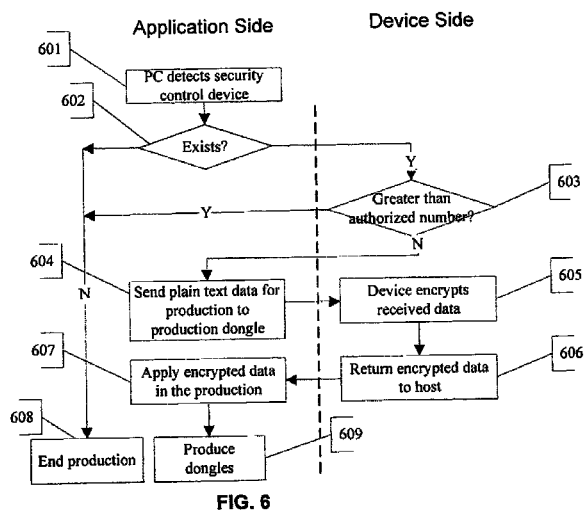
FIG. 6 is a control flow diagram according to the third embodiment of the present invention.

Referring to FIG. 6, the production host detects the security control device, as shown in Step 601, and judges whether it exists or not, as shown in Step 602. If not, go to Step 608 and end the production. If it exists, then judge whether the number of dongles produced is greater than the number of security control devices authorized, as shown in Step 603. If it is, end the production process, as shown in Step 608. Otherwise, the host sends the plain text data for production to the security control device, as shown in Step 604. The security control device encrypts the data, as shown in Step 605 and returns the encrypted data to the host, as shown in Step 606. The host applies the cipher text data it has received to the production data, as shown in Step 607. The host can then proceed to produce dongles, as shown in Step 609.

In foregoing embodiments:
1. The encryption/decryption algorithm can be RSA, DES, or 3DES etc. There are many ways, standard or customized, to implement encryption/decryption.
2. To judge the number of dongles produced, using built-in counter can be a practical way. The developer can set the number of dongles to be produced, depending on its requirement. Note that this value is protected and cannot be modified without permission.
3. To determine data integrity, set some flags in the data. Thereby, the data decrypted using appropriate hardware contains correct use flags.

The production security control apparatus for software products and the control method thereof provided by the present invention are described in details above. It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A security control method using a hardware security control device for controlling production of a software protection dongle, comprising steps of:
   detecting the security control device by a host;
   ending the production of the software protection dongle when the security control device is not detected;
   determining whether the security control device is authorized or valid by the host when the security control device is detected;
   starting production of the software protection dongle by a production tool if the security control device is authorized or valid;
   determining whether a number of dongle produced is greater than a number of dongle authorized;
   ending production of the software protection dongle if the number of the software protection dongle produced is greater than the authorized number;
   sending encrypted data to the security control device by the host, if the number of dongle produced is less than the number of dongle authorized;
   decrypting the received encrypted data by the security control device;
   returning the decrypted data to the host by the security control device;
   determining integrity of the decrypted data by the host;
   generating in-dongle data on the basis of the decrypted data by the host;
   burning the in-dongle data into the dongle with the production tool by the host to complete production of the software protection dongle.

2. The security control method according to claim 1, wherein an encryption/decryption algorithm for the encrypted data is RSA, DES or 3DES.

3. A security control method using a hardware security control device for controlling production of a software protection dongle, comprising steps of:
   detecting the security control device by a host;
   ending the production of the software protection dongle when the security control device is not detected;
   determining whether the security control device is authorized or valid by the host when the security control device is detected;
   starting production of the software protection dongle by a production tool if the security control device is authorized or valid;
   determining whether a number of dongle produced is greater than a number of dongle authorized;
   ending production of the software protection dongle if the number of the software protection dongle produced is greater than the authorized number;
   extracting encrypted data from the security control device by the host, if the number of dongle produced is less than the number of dongle authorized;
   generating in-dongle data on the basis of the encrypted data by the host;
   burning the in-dongle data into the dongle with the production tool by the host to complete production of the software protection dongle.

4. The security control method according to claim 3, wherein an encryption/decryption algorithm for the encrypted data is RSA, DES or 3DES.

5. A security control method using a hardware security control device for controlling production of a software protection dongle, comprising steps of:
   detecting the security control device by a host;
   ending the production of the software protection dongle when the security control device is not detected;
   determining whether the security control device is authorized or valid by the host when the security control device is detected;
   starting production of the software protection dongle by a production tool if the security control device is authorized or valid;
   determining whether a number of dongle produced is greater than a number of dongle authorized;
   ending production of the software protection dongle if the number of the software protection dongle produced is greater than the authorized number;
   sending data to the security control device by the host, if the number of dongle produced is less than the number of dongle authorized;
   encrypting the data by the security control device;
   returning encrypted data to the host,
   generating in-dongle data on the basis of the encrypted data by the host;
   burning the in-dongle data into the dongle with the production tool by the host to complete production of the software protection dongle.

6. The security control method according to claim 5, wherein an encryption/decryption algorithm for the encrypted data is RSA, DES or 3DES.

* * * * *